Aug. 20, 1940.  G. M. BUCHANAN  2,212,006
CONVEYER OF THE ENDLESS BELT TYPE
Filed Dec. 4, 1939  3 Sheets-Sheet 1

Inventor
GEORGE M. BUCHANAN
by
Harold W. Hawkins.
Attorney

Inventor
GEORGE M. BUCHANAN
by
Harold W. Hawkins.
Attorney

Aug. 20, 1940.  G. M. BUCHANAN  2,212,006
CONVEYER OF THE ENDLESS BELT TYPE
Filed Dec. 4, 1939  3 Sheets-Sheet 3
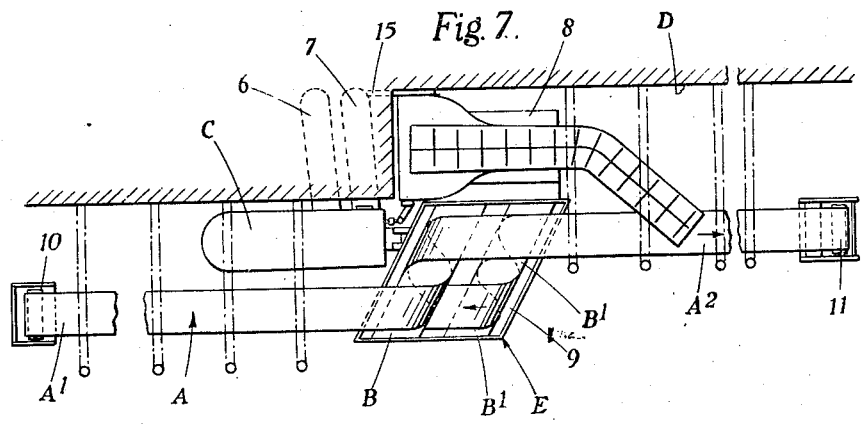
Inventor
GEORGE M. BUCHANAN
by
Harold W. Hawkins.
Attorney Patented Aug. 20, 1940

2,212,006

UNITED STATES PATENT OFFICE 2,212,006

CONVEYER OF THE ENDLESS BELT TYPE

George Macdonald Buchanan, Glasgow, Scotland, assignor to Mavor and Coulson, Limited, Glasgow, Scotland Application December 4, 1939, Serial No. 307,405
In Great Britain October 31, 1938

3 Claims. (Cl. 198—117)

This invention refers to conveyers of the endless belt type, particularly, but not exclusively, conveyers for use underground in mines, i. e. conveyers adapted to be extended or contracted as required by the addition or removal of belt supporting units and lengthening or shortening of the belt.

According to this invention, the upper run or the lower run (or both the upper and the lower run) of an endless belt conveyer, is for part of its length offset laterally relative to the adjoining part or parts by the belting being constrained into a transverse helical or scroll form at one or more positions to give the lateral displacement necessary for the offset.

In carrying the invention into practice, the helical or scroll formation is produced by the belt being wrapped on a guide arrangement of cylindrical or equivalent character disposed obliquely to the direction of conveyance, about which the belt forms a helix or scroll of approximately 360°.

The lateral displacement of the belt may be obtained by the formation of a continuous scroll of 360° about a single axis, or by the formation of two separate scrolls of 180° the axes of which are parallel and spaced apart transversely.

An important application of a conveyer according to the invention is in coal mining where a loading machine is used in conjunction with a coal cutting machine, the latter cutting the coal face in such a way that the coal breaks down as it is cut on to the loader by means of which the broken coal is loaded on to a face conveyer. Combined cutting and loading apparatus is shown in the specification of United States Patent No. 2,031,421, granted to W. A. Logan and assigned to Mavor and Coulson, Limited. It is desirable that the operative part of a face conveyer in such cases, i. e. the part extending behind the loading machine, should be as close to the coal face as possible to avoid the necessity of loading the conveyer through between props used for roof support. Ordinarily, however, the body of the coal cutting machine prevents the conveyer being laid close to the face. By using a conveyer both of whose runs are offset laterally at substantially the same position in the length of the conveyer, part of the conveyer may be arranged to extend along in front of the face clear of the track of the coal cutting machine, while the remainder extends close to the line of the face being cut and immediately behind the body of the coal cutting machine. If then the guides used to effect the offset are mounted so as to move with the machine, and the two terminals of the conveyer are fixed in position, the part of the conveyer following behind the machine will be extended and the other part reduced as mining proceeds, the conveying belt continuing to run all the time.

A problem in the use of belt conveyers in mines is that of dealing with spillage which falls from the upper run of the belt on to the lower run. In accordance with a further application of the invention the top run of a belt conveyer may be offset laterally for a short part of its length and then brought back to its original line, thus exposing the lower run of the belt where the upper run is offset. Spillage on the lower run may then be elevated at this gap on to the top run.

The invention will now be described with reference to the accompanying drawings, in which:

Figure 7 is a plan view illustrating the application of the invention to a conveyer at the coal face in a coal mine, Figure 8 is a plan view and Figures 9 and 10 are two side views showing the application of the invention to spillage return.

Figure 1:
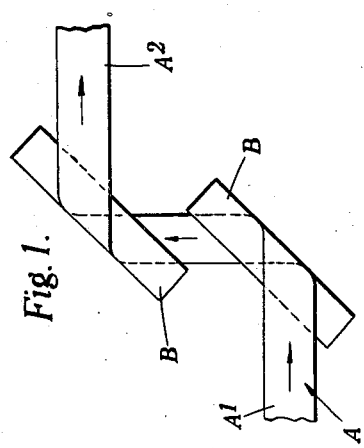
Figure 4:
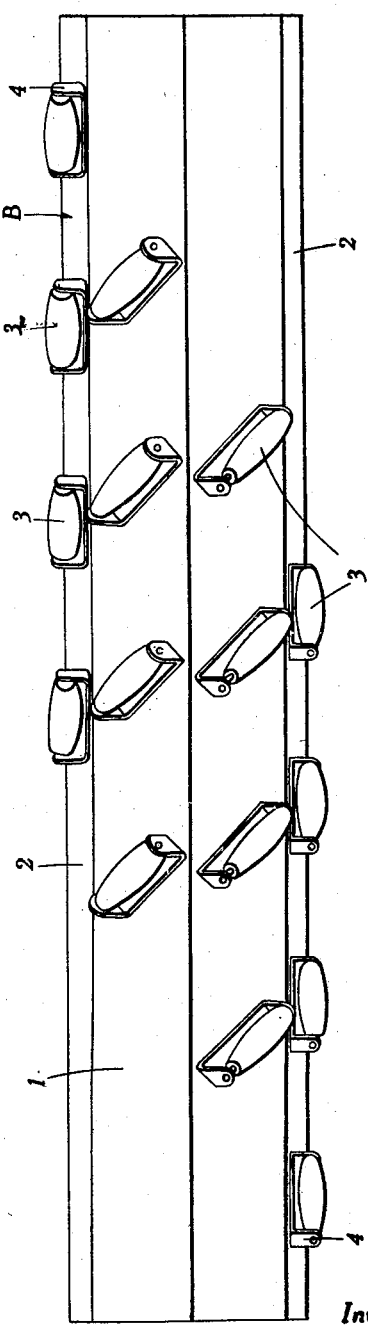
Figure 4 is a front view.
Figure 5:
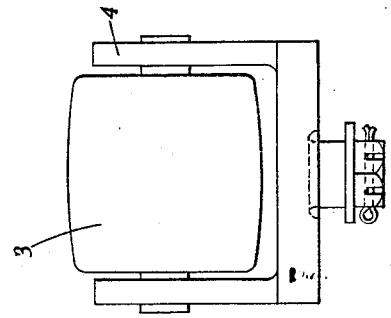
Figures 5 and 6 are detail views, illustrating a form of scroll guide.
Figure 6:
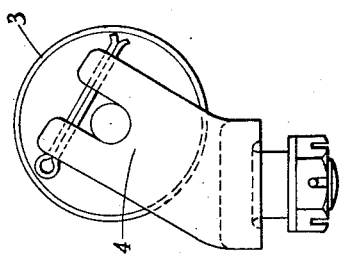
Figure 3:
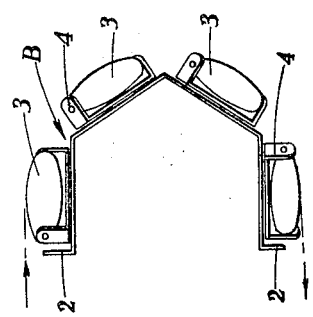
Figure 3 is an end view.

Figure 1 shows the belt A of a belt conveyer and two oblique parallel guides B, assumed to be cylindrical. The belt A is formed into a scroll of 180° on the first guide and its direction changed through 90° in the horizontal direction, passing over and under the first guide. On the second guide, a scroll of 180° is also formed, the belt passing under and over the guide and its direction being changed through 90° in the horizontal direction. The two parts $A^1$ and $A^2$ of the belt are thus relatively offset laterally.

Figure 2:
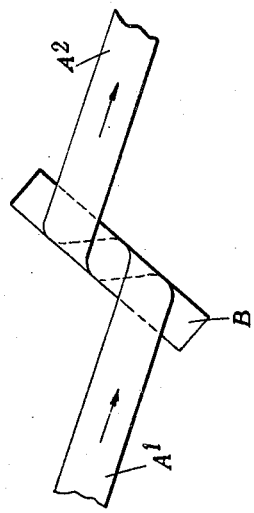
Figures 1 and 2 are diagrams, illustrating the offsetting of a conveyer belt.

Figure 2 shows the offsetting of a belt A by its being formed into a continuous helix of 360° on a single cylindrical guide B.

In practice, the guides may be constructed as shown in Figures 3, 4, 5 and 6, for use in an arrangement as shown in Figure 1. The guide B comprises a tubular support 1 of the four-sided form shown, with top and bottom flanges 2 and with idler rollers 3 mounted upon it. Each roller is short axially compared with the width of the belt A and the rollers 3 define a scroll or helical path for the belt around the guide. Each of the rollers 3 is of the cambered form shown, see Figures 5 and 6, and is supported in a mounting 4. The mounting 4 is of the cranked form shown in Figure 6 and is free to turn on the support 1 so that the roller 3 constitutes a castor capable of adjusting itself under the action of the belt into a position in which its axis of rotation is at right angles to the direction of travel of the belt.

If a guide is to provide for the formation of a single scroll of 360°, the same principle is adopted, a support of hexagonal form being used with the roller path continued all round the support.

Referring now to Figure 7, this shows a coal cutting machine C having an under-cutting jib 6 and an overcutting jib 7, and a mechanical loader 8 towed along the coal face D by the coal cutting machine. A belt conveyer is again indicated by A, the conveyer extending along the coal face and comprising two parts A¹ and A² offset laterally relative to one another by the action of a guide unit E. The guide unit E comprises a structure 9 and a pair of scroll guides B, B¹ set obliquely to the coal face and placed at different heights and one in front of the other. The conveyer belt extends in a single circuit between two terminal positions 10 and 11. The loader 8 carries a shearing cutter-chain 15 and is coupled to the machine C as in British Patent specification No. 493,496, W. A. Logan.

Guide unit E is coupled to the machine C and has a skid base to facilitate its travelling over the floor. The circuit of the belt A is as follows:

Starting from the left hand terminal 10, a first run of belting extends along on the goaf side of the machine C to the upper guide B. The belt passes round this guide in scroll fashion as illustrated in Figure 2, leaving the guide B offset laterally relative to the first run of belting. The belt extends along the face to the delivery position 11 where it passes over and under a return drum forming part of a driving gear, and a lower run of the belt returns to the lower guide B¹, round which it passes in a 360° scroll, emerging from the guide unit E as a lower run extending back to the terminal position 10 under the first run of belting.

In operation, the two terminal positions 10 and 11 are fixed. As the coal cutting machine progresses along the coal face and cuts the coal, the coal breaks down on to the loader 8, by which it is loaded on to the upper run of the part A² of the conveyer A, Figure 7, and is carried to the position 11 where it is discharged. The part A¹ of the belt runs idle but as the machine progresses it moves the guide unit E along with it, extending the part A² of the belt and reducing the part A¹. Props with beams for roof support are indicated at K.

Referring now to Figures 8, 9 and 10 these show a guide unit F supporting two scroll guides B³ and B⁴. The guides B³ and B⁴ are set with their axes in the same horizontal plane and oblique to one another. The unit F constitutes a tension end unit for the belt of the conveyer A, and comprises a return drum 12. The lower run of the belt A passes from the right into the unit F and under and over the drum 12. From the drum 12, the belt extends in a scroll of 360° round the guide B³ which it leaves parallel to but offset from the direction in which it approaches the guide B³. Travelling a short distance the belt passes on to the scroll guide B⁴ upon which it is formed into a scroll of 360°, which brings it back into its original alignment. From the guide B⁴ the upper run of the belt extends to the right as the conveying run. A scraper or scoop 13 of the form shown in Figure 10 is placed in the gap between the scrolls with its lower transverse edge acting on the upper surface of the lower run, and an elevator H of bucket or scraper type is located in the gap, the elevator H being driven by a chain 14 from the shaft of the drum 12.

Spillage which has reached the lower run of the belt comes against the scraper 13 where it accumulates. Here it is picked up by the elevator H which is arranged to deliver the spillage on to the conveying run of the belt as it leaves the scroll guide B⁴.

I claim:

1. A conveyer comprising a conveyer belt, rollers for the support and guidance of the belt to form an endless belt circuit with upper and lower belt runs, and guide means of cylindrical character for each run arranged obliquely to, and at an intermediate position in, the length of the conveyer, each run of the belt having a part of transversely extending scroll formation formed on the corresponding guide means and turning the belting helically through approximately 360°, so that the line of travel of each run as it leaves its guide means continues in substantially the same direction and is offset transversely relative to the line of travel of that run as it reaches its guide means.

2. A conveyer comprising a conveyer belt, rollers for the support and guidance of the belt so that an endless belt circuit with upper and lower belt runs is formed, guide means of cylindrical character for each run arranged obliquely to, and at an intermediate position in, the length of the conveyer, each run of the belt having a part of transversely extending scroll formation formed on the corresponding guide means and turning the belting helically through approximately 360°, so that the line of travel of the belt as it leaves its guide means is offset transversely relative to the line of travel of the belt as it reaches its guide means, and a movable carrier structure in which the guide means are mounted and which constitutes a carriage movable lengthwise between the ends of the conveyer, so that the position of offset can be varied by movement of the carrier structure.

3. A conveyer comprising a conveyer belt, rollers for the support and guidance of the belt so that an endless belt circuit with upper and lower belt runs is formed, two guide members of cylindrical character one for each run arranged obliquely to, and at an intermediate position in, the length of the conveyer, each run of the belt having a part of transversely extending scroll formation formed on the corresponding guide member and turning the belting helically through approximately 360°, so that the line of travel of each run as it leaves its guide member is offset transversely relative to the line of travel of that run as it reaches its guide means, and a movable carrier structure in which the guide means are mounted whereby the transversely offset section of each run may be readily varied longitudinally of said conveyer belt.

GEORGE M. BUCHANAN.